(12) United States Patent
Zorine

(10) Patent No.: US 7,083,062 B2
(45) Date of Patent: Aug. 1, 2006

(54) ORIENTATIONLESS INTERNAL CLOSURE/RETAINER AND VALVE ASSEMBLY EMPLOYING SAME

(75) Inventor: Maxim V. Zorine, Ann Arbor, MI (US)

(73) Assignee: Eaton Corporation, Cleveland, OH (US)

( * ) Notice: Subject to any disclaimer, the term of this patent is extended or adjusted under 35 U.S.C. 154(b) by 80 days.

(21) Appl. No.: 10/351,819

(22) Filed: Jan. 27, 2003

(65) Prior Publication Data

US 2004/0144784 A1  Jul. 29, 2004

(51) Int. Cl.
*B65D 14/16* (2006.01)
*B65D 51/16* (2006.01)

(52) U.S. Cl. .............................. 220/203.2; 220/203.21; 220/786; 123/516

(58) Field of Classification Search ............. 220/203.2, 220/203.21, 203.29, 254.7, 254.1, 784, 788, 220/8, 786; 215/263, 274, 275; 123/516
See application file for complete search history.

(56) References Cited

U.S. PATENT DOCUMENTS

| | | | |
|---|---|---|---|
| 3,889,842 A | 6/1975 | Bennett | |
| 3,912,117 A | 10/1975 | Ryding | |
| 4,548,331 A | 10/1985 | Montgomery | |
| 5,165,560 A | * 11/1992 | Ennis et al. | 215/247 |
| 5,678,718 A | * 10/1997 | Morris et al. | 220/254.1 |
| 5,809,976 A | 9/1998 | Cook et al. | |
| 6,170,510 B1 | 1/2001 | King et al. | |
| 6,371,146 B1 | 4/2002 | Benjey | |
| 6,508,263 B1 | 1/2003 | Jahnke et al. | |

* cited by examiner

*Primary Examiner*—Nathan J. Newhouse
*Assistant Examiner*—Niki M. Eloshway
(74) *Attorney, Agent, or Firm*—Anna M. Shih

(57) ABSTRACT

A closure/retainer for the end of a tubular hollow having a plurality of engagement surfaces such as windows formed about the inner periphery. The closure/retainer has a plurality of locking fingers disposed thereabout, with the number, width and spacing of the fingers such that each window is engaged by at least one locking finger for any random rotary orientation of the closure/retainer. The closure/retainer is particularly suitable for automated axial assembly as for example in a fuel tank vapor vent valve for retaining the float in the tubular valve body.

20 Claims, 3 Drawing Sheets

ORIENTATIONLESS INTERNAL CLOSURE/RETAINER AND VALVE ASSEMBLY EMPLOYING SAME

BACKGROUND OF THE INVENTION

The present invention relates to closures or retainers for hollow chambers and particularly closures for tubular members where it is desired to insert the closure member in an open end of the tubular member for providing closure thereto and/or retaining other members within the tubular member. In particular, the present invention relates to retainers or closures for retaining a float operated valve in a valve body having a float chamber such as for vapor vent valves for controlling flow of vapor in a fuel tank to a vent passage extending externally of the tank.

Heretofore, fuel tank vapor vent valves have employed a float operated valve for closing against a vent port upon movement of the float toward the vent port from rising fuel level in the tank during refueling, sloshing or rollover of the vehicle. In known float operated fuel tank vapor vent valves, the float and valve are assembled into the float chamber or hollow tubular portion of the valve body and a cap or retainer is inserted therein for retaining the float in the chamber. Typically, spring tabs or fingers are provided on the cap or closure for engagement with corresponding engagement or locking surfaces, such as windows, formed in the tubular hollow upon insertion of the closure therein. However, this arrangement has the disadvantage that the end cap must be properly oriented rotationally or in a circumferential direction during insertion to insure that the fingers or tabs on the closure engage the locking or engagement surfaces provided in the valve body. This has been a disadvantage or drawback where it is desired to provide for automated insertion of the closure or end cap into the body. Where it has been desired to automate such an assembly, it has been found extremely costly and complex to provide both axial and rotary alignment of the cap during the automated assembly.

Thus, it has long been desired to provide a way or means of assembling a closure/retainer in a tubular hollow without the need for rotational or circumferential orientation to insure engagement of the locking surfaces of the closure against the engagement surfaces provided in the tubular hollow.

BRIEF SUMMARY OF THE INVENTION

The present invention provides an rotationally orientationless closure/retainer for internal assembly in a hollow, particularly of the open end of a tubular member. The closure/retainer is provided with retaining, or locking fingers or tabs which engage corresponding engagement surfaces, such as windows, formed in the circumferential surface of the tube or hollow. The engagement surfaces of the tubular hollow are of circumferential extension and spacing so as to permit engagement of at least one of the retaining fingers with each one of the engagement surfaces in the tubular hollow. The closure/retainer of the present invention may be inserted in the end of an open tubular member and snap locked therein irrespective of the rotational orientation of the closure/retainer with respect to the tubular hollow and thus lends itself readily to automated assembly.

DETAILED DESCRIPTION OF THE INVENTION

Figure 1:
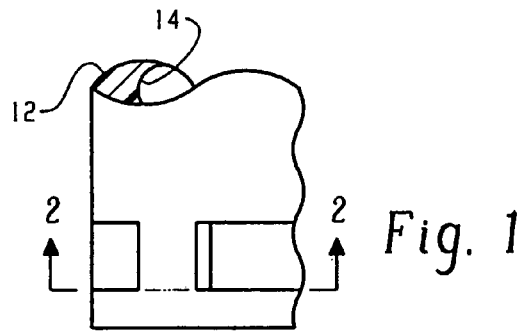
FIG. 1 is a portion of a side elevation view of a tubular member of employing the present invention.
Figure 2:
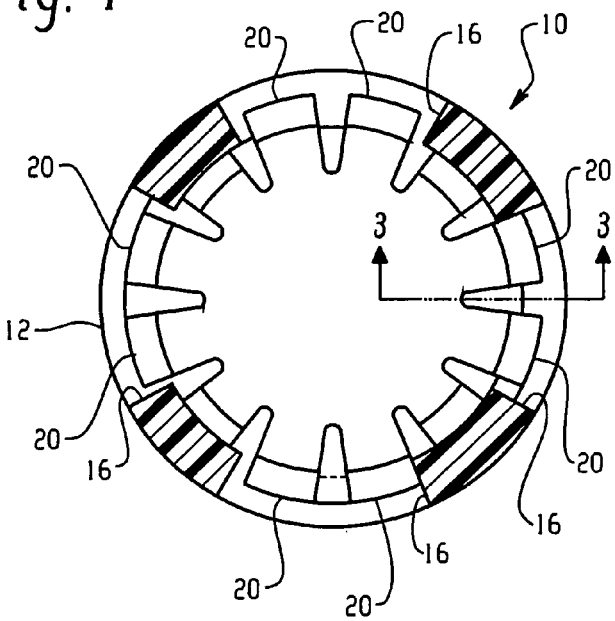
FIG. 2 is a cross section taken along section indicating lines 2—2 of FIGS. 2, 1 and 3.
Figure 3:
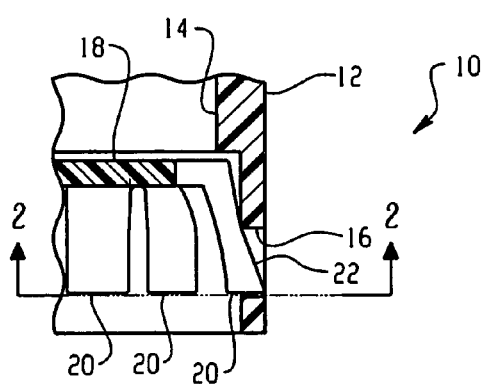
FIG. 3 is a section view taken along section indicating lines 3—3 of FIG. 2.

Referring to FIGS. 1 through 3, a closure/retainer assembly is indicated generally at 10 and includes a tubular member or housing 12 having a hollow interior hollow 14. The periphery of a the hollow 14 has provided thereabout in circumferentially spaced arrangement a plurality of engagement surfaces preferably comprising windows 16 the number, spacing and circumferential width thereof which will be hereinafter described in greater detail.

A closure/retainer member 18 has a plurality of circumferentially spaced fingers or tabs 20 each provided with a locking or engagement surface 22 on the tip thereof. Preferably surface 22 is tapered to provide a camming action upon axial assembly. The number, circumferential spacing and width or arcuate extension of the fingers 20 will be described hereinafter in greater detail. The fingers 20 are configured so as to be deflected inwardly by the surface 22 engaging the edge or end of the member 12 upon insertion of the closure 18 therein and elastically rebound or spring to move outwardly in a radial direction to engage the edge surface of the windows 16 adjacent the open end of the tubular member 12. This engagement is illustrated in FIGS. 2 and 3.

Figure 4:
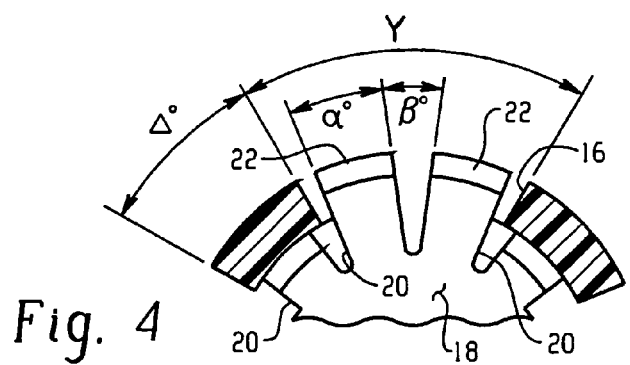
FIG. 4 is a schematic of a portion of FIG. 3 showing the identification of the various angular relationships of the locking fingers and engagement surfaces.

Referring to FIG. 4, the arcuate extension or width of each of the windows 16 is denoted by the reference character ($\gamma$) Gamma and the spacing between the windows denoted by the reference character ($\Delta$) Delta. The fingers or tabs 20 each have an arcuate extension or width denoted by the reference character ($\alpha$) Alpha and an arcuate spacing denoted by the reference character ($\beta$) Beta.

Fingers 20 in windows for engagement surfaces 16 are arranged such that for a plurality N of the fingers 20 and a number K of the engagement surfaces 16 the relationship of the number N with respect to K is set forth by the expression N=K (m+i) where m is an integer of at least 2 and is the maximum number of fingers 20 engaged in each window 16; and, i is an integer of at least one and is the minimum number of fingers contacting each space between the windows 16.

The central angle subtended by each of the engagement surfaces or windows 16 is denoted by the reference character Gamma ($\gamma$) and is determined by the expression: $\gamma=360°\times m/N$. The central angle Delta ($\Delta$) subtended by the spacing between the engagement surfaces 16 is determined by the expression:

$$\Delta=360°(1/K-m/N)$$

The central angle is determined by the expression:

$$\beta=\gamma/m-\alpha$$

where α is the central angle subtended by the circumferential extent or width of each of the blocking fingers.

The relationship between α and β is determined from the expression:

$$\alpha + \beta = \gamma/m.$$

Thus, from the forgoing expressions it will be seen that for any chosen value of m, i and the engagement surface K, the corresponding number of locking fingers N their width α and spacing β and engagement surface angle γ may be determined. This, aforesaid relationship insures that each of the windows or engagement surfaces 16 will have at least one of the locking fingers 20 engaged therein for any random or rotational orientation of the closure 18 with respect to the body 12 to thereby permit insertion and locking by axial movement only.

Figure 5:
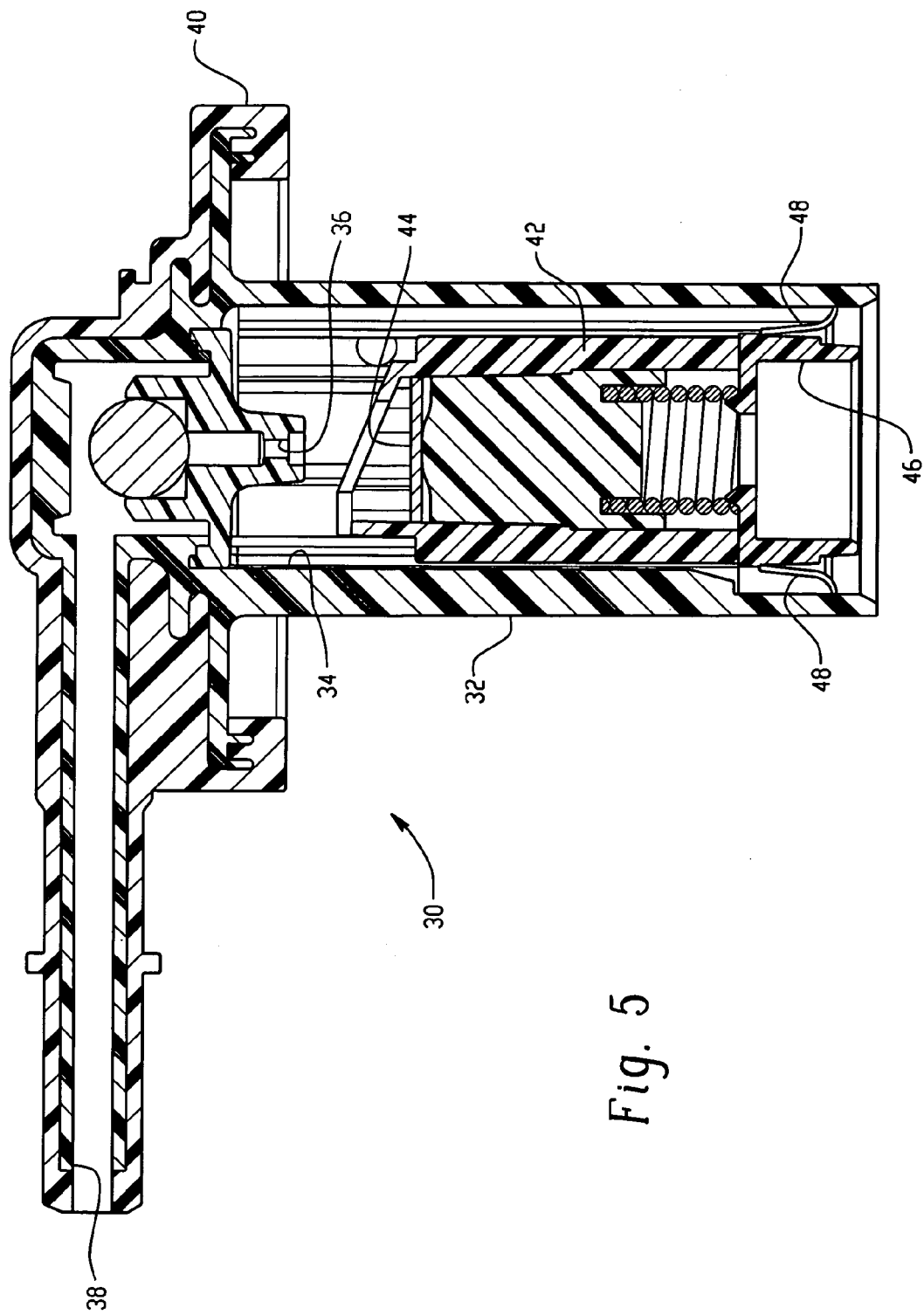
FIG. 5 is a cross section of a valve assembly employing the present invention.
Figure 6:
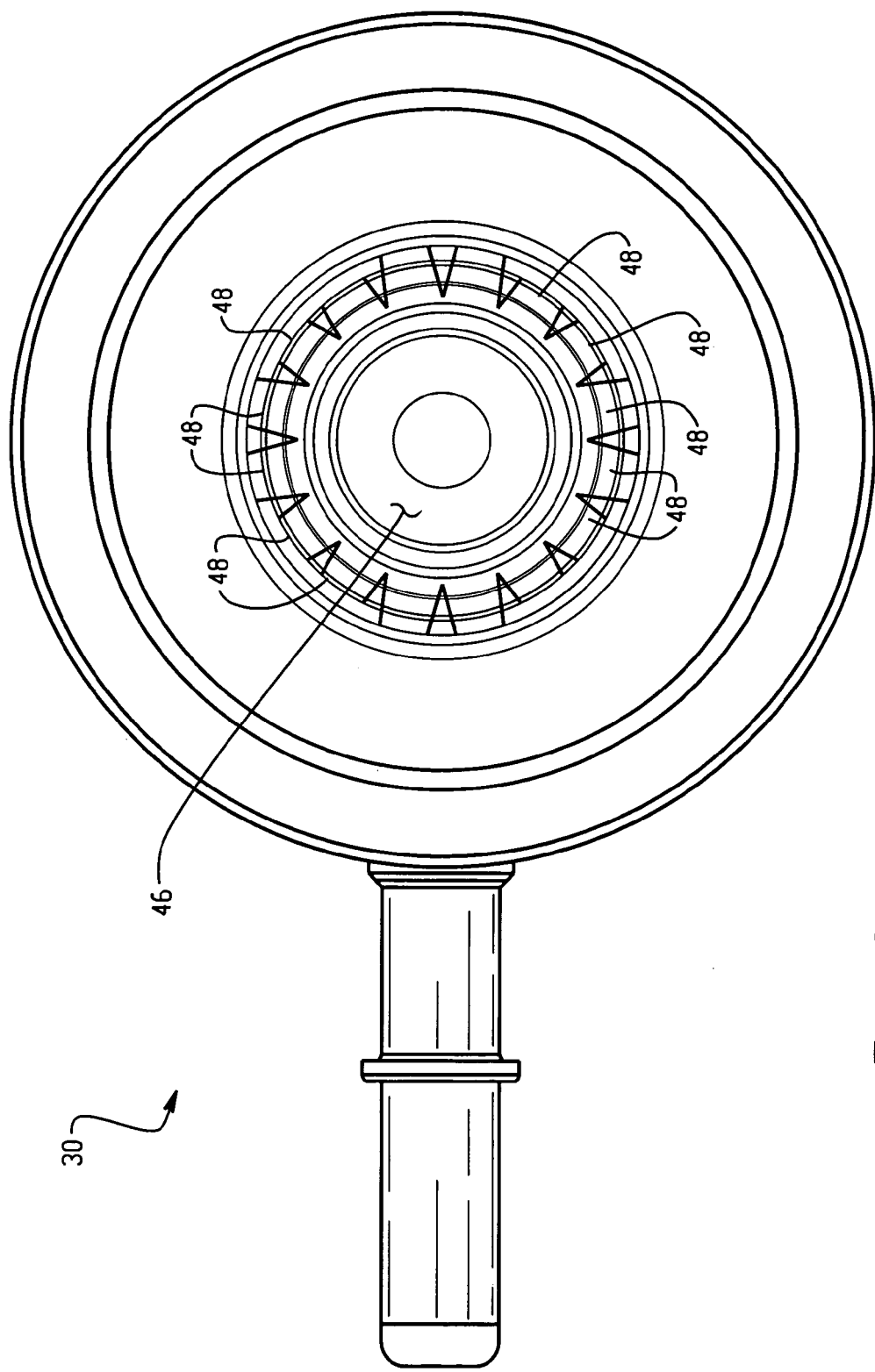
FIG. 6 is a bottom view of the valve assembly FIG. 5.

Referring to FIGS. 5 and 6, the invention is shown as embodied in the float operated fuel vapor vent valve indicated generally in 30 and having a body 32 with a float chamber 34 is a vent outlet port 36 formed in the upper end of the chamber for permitting fuel vapor to discharge to a vent passage 38 exposed externally of the fuel tank. It will be understood that the valve body 32 includes a mounting flange 40 to permit the valve to be inserted from the exterior of the tank to an access opening therein and the flange subsequently secured to the tank, as for example by weldment. The chamber 34 has disposed therein a float 42 which has a resilient valve member 44 retain thereon and which closes against port 36 upon the float being moved upwardly by rising fuel level in the tank. The float 42 is retained in the lower end of the body 32 by a retainer or closure 46 which is made in accordance with the invention and which has a plurality of radially outwardly extending fingers 48 disposed thereon for engagement with corresponding engagement surfaces (not shown in FIG. 5) formed on the inner peripheral surface of the open end of the body 32. It will be understood that the arrangement, and width and spacing of the fingers 48 and engagement surfaces in the embodiment of FIGS. 5 and 6 is determined by the procedures set forth above with respect to FIGS. 1 through 4.

The present invention thus provides for a closure/retainer for internal assembly in a tube or hollow chamber having a plurality of engagement surfaces disposed there around with corresponding fingers provided on the closure/retainer for engaging the engagement surfaces upon axial insertion therein. The closure of the present invention provides for the spacing and circumferential width of the engagement surfaces and the fingers in such a manner that each of the engagement'surfaces has at least one of the fingers engaged therein irrespective of the random rotational orientation of the closure/retainer. The closure/retainer of the present invention thus permits automated assembly of a closure into the end of a tubular member by axial movement only and without requiring any rotational orientation to insure engagement of the locking surfaces. The invention finds particular applications in the automated assembly of a closure/retainer for the float in the body of a float operated fuel vapor vent valve.

Although the invention has hereinabove been described with respect to the illustrated embodiments, it will be understood that the invention is capable of modification and variation and is limited only by the following claims.

The invention claimed is:

1. An internally mounted closure assembly comprising:
  (a) a tubular member with a plurality of K discrete windows, each window having an edge surface acting as an engagement surfaces, wherein said windows are circumferentially spaced thereabout adjacent one end thereof;
  (b) a plug member configured to interfit said one end and having a plurality of N locking fingers extending radially therefrom in circumferentially spaced arrangement wherein fix any circumferential orientation of the plug member with respect to the tubular member, at least one of said locking fingers engages each of said engagement surfaces,
    wherein each of said locking fingers is deflectable outwardly in the radial direction to engage the edge surface of each of said windows.

2. The closure assembly defined in claim 1, wherein N=K (m+i), where i is an integer of at least one, m is the integer of at least two and the central angle γ subtended by each engagement surface γ=360° m/N, the central angle Δ subtended by the space between said engagement surface is $$\Delta = 360°\left(\frac{1}{K} - \frac{m}{N}\right),$$

the central angle subtended by the spacing β between the locking fingers is determined from β=γ/m−α, where α is the circumferential extent of each of the locking fingers.

3. The closure assembly defined in claim 1, wherein said plug member has a generally cup-shaped configuration.

4. The closure assembly defined n claim 1, wherein said tubular member has an annular shoulder formed therein and said plug is registered thereagainst.

5. The closure assembly defined in claim 1, wherein each of said locking fingers engages one of said engagement surfaces in snap locking engagement.

6. The closure assembly defined in claim 1, each of said plug members is formed of plastic material.

7. The closure assembly defined in claim 6, wherein said discrete engagement surfaces each comprises an edge of a window formed in said tubular member.

8. The closure assembly of claim 1, wherein each of said locking fingers has a tapered surface that cams the edge surface of each of said plurality of windows.

9. A fuel vapor vent valve assembly comprising:
  (a) a valve body adapted for installation in a fuel tank having a float chamber with a vent passage communicating with a vent outlet port and a generally tubular open end;
  (b) a float disposed in the float chamber and operable to close the vent port upon fuel rising to a certain level in the tank;
  (c) a retaining member received in said open end with a plurality of N circumferentially spaced fingers extending radially therefrom,
    wherein the valve body has a plurality of K discrete windows, each window having an edge surface acting as an engagement surface, in said valve body,
    wherein at least one of said fingers is engaged with each of said engagement surfaces for any circumferential orientation of said cap with respect to said body,
    and wherein each of said fingers is deflectable outwardly in the radial direction to engage the edge surface of each of said windows.

10. The assembly defined in claim 9, wherein N=K (m+i), where i is an integer of at least one m is an integer of at least two, the central angle γ subtended by each engagement surface is $$\gamma = 360° \frac{m}{N}$$

the central angle Δ subtended by the space between windows is $$\Delta = 360° \left( \frac{1}{K} - \frac{m}{N} \right),$$

the central angle subtended by the spacing β between the fingers is determined from $$\beta = \frac{\gamma}{m} - \alpha.$$

where α is the circumferential extent of each of the locking fingers.

11. The valve assembly defined in claim 9, wherein said body and plug are formed of plastic material.

12. The valve assembly defined in claim 9, wherein said fingers are elastically deflectable both inwardly and outwardly in the radial direction.

13. The valve assembly defined in claim 9, wherein each of said discrete engagement surfaces includes an edge of a window formed in said body.

14. The valve assembly defined in claim 9, wherein each of said fingers engages one of said engagement surfaces in snap locking arrangement.

15. The valve assembly defined in claim 9, wherein said body has an annular shoulder formed therein with said retaining member registered against said shoulder.

16. The valve assembly defined in claim 9, wherein said retaining member has a cup-shaped configuration.

17. The closure assembly of claim 9, wherein each of said fingers has a tapered surface that cams the edge surface of each of said plurality of windows.

18. A method of assembling a float operated valve comprising:
(a) providing a valve body with an open ended float chamber; having a vent port communicating with a vent outlet and a plurality of windows, each window having an edge surface acting as an engagement surface;
(b) disposing a float operated valve member in said chamber; and,
(c) providing a plug with a plurality of circumferentially spaced fingers extending radially therefrom, wherein for any circumferential orientation of the plug with respect to the valve body, at least one of said fingers engages each of said engagement surfaces, and
(d) inserting the plug in random circumferential orientation and engaging each of said engagement surfaces with at least one of said fingers by deflecting each of said fingers outwardly in the radial direction to engage the edge surface of each of said windows.

19. The method defined in claim 18, wherein said step of inserting comprises inserting said plug only in an axial direction.

20. The method defined in claim 18, wherein said step of engaging includes snap locking.

* * * * *